United States Patent Office 3,418,366
Patented Dec. 24, 1968

3,418,366
PHOSPHONITRILE COMPOSITIONS AND METHODS
Harry H. Sisler, Gainesville, Fla., assignor to W. R. Grace & Co., New York, N.Y., a corporation of Connecticut
No Drawing. Continuation-in-part of applications Ser. No. 154,827, Ser. No. 154,828, Nov. 24, 1961, and Ser. No. 426,680, Jan. 19, 1965. This aplication July 1, 1966, Ser. No. 567,798
10 Claims. (Cl. 260—551)

ABSTRACT OF THE DISCLOSURE

Organo substituted phosphonitrilic compounds are prepared by reacting a disubstituted monochlorophosphine with chloramine and ammonia or an equivalent thereof. The phosphonitrilic compounds find utility in the preparation of organic substituted phosphonitrilic polymers which possess high temperature resistant properties.

---

This application is a continuation-in-part of my application 426,680, filed Jan. 19, 1965, now abandoned, and applications, Ser. No. 154,827 and 154,828, filed Nov. 24, 1961, now abandoned.

The present invention relates to organic substituted phosphonitrilic compounds, and more specifically to novel phosphonitrilic polymer intermediates and polymers as well as to methods for their preparation.

In recent years considerable interest has been expressed in the development of "inorganic polymers" having polymeric skeletons or "backbones" which do not contain carbon atoms. For several applications, particularly high-temperature use, inorganic polymers often exhibit better stability and strength characteristics than their carbon backbone counterparts. Some of the more promising inorganic polymers have been phosphonitrilic polymers which possess polymeric structures composed of repeating phosphonitrilic units. A general formula $(\!=\!-R_2P\!=\!N)_n$ wherein R is often a hydrocarbon radical and $n$ represents a number of repeating phosphonitrilic units is often used to illustrate these compounds.

To date, the number of phosphonitrilic polymers available is extremely limited. Furthermore, the presently known methods for preparing phosphonitrilic polymers and their monomeric precursors are extremely tedious and expensive.

It is therefore an object of the present invention to provide a novel class or organic substituted phosphonitrilic polymers and polymer intermediates.

It is another object to provide a method by which phosphonitrilic polymers and polymer intermediates may be conveniently and economically prepared.

These and still further objects of the present invention will become readily apparent to one skilled in the art from the following detailed description and specific examples.

In general, the present invention contemplates the following novel embodiments:

(I) Novel polymer intermediates having the formulae:

(1)          $[R_2P(NH_2)_2]Cl$ wherein R represents lower alkyl and aryl, and (2)          $[R_2P(NH_2)\!=\!N\!-\!P(NH_2)R_2]Cl$ wherein R represents lower alkyl, and (3)          $R_2P\!=\!N\!-\!PR_2$
                     $|$      $||$
                     Cl    NH wherein R=lower alkyl and aryl (II) A novel method for preparing compounds of the formulae:

$[R_2P(NH_2)_2]Cl$, $[R_2P(NH_2)\!=\!N\!-\!P(NH_2)R_2]Cl$ $R_2P\!=\!N\!-\!PR_2$ and $(R_2P\!=\!N)_{3\text{ and }4}$
   $|$     $||$
   Cl   NH wherein R represents lower alkyl and aryl, which involves reacting a disubstituted monochloro phosphine with chloramine and ammonia, or a compound which for the purposes of the reaction is formally equivalent to chloramine and ammonia, such as hydrazine, hydrazine monohydrochloride (hydrazinimum chloride), and hydrazine dihydrochloride.

(III) A novel method for preparing linear polymers having the formula:

$(R_2P\!=\!N)_n$ wherein R represents lower alkyl and $n$ has a value greater than 2 which comprises heating polymer intermediates having the formulae:

$[R_2P(NH_2)_2]Cl$, $[R_2P(NH_2)\!=\!N\!-\!P(NH_2)R_2]Cl$ and $R_2P\!=\!N\!-\!PR_2$
   $|$     $||$
   Cl   NH wherein R represents lower alkyl to a temperature in excess of 25° C. to about 300° C.

More specifically, I have found that the above novel phosphonitrilic processes and products may be carried out and prepared in accordance with the detailed procedures and examples set for in the following:

POLYMER INTERMEDIATES AND THE PREPARATION THEREOF

As indicated above, the novel phosphonitrilic polymer intermediates of the present invention possess the formulae:

(I)          $[R_2P(NH_2)_2]Cl$
(II)        $[R_2P(NH_2)\!=\!N\!-\!P(NH_2)R_2]Cl$
(III)       $R_2P\!=\!N\!-\!PR_2$
                 $|$      $||$
              Cl   NH wherein in (I) and (III) R represents alkyl having from about 1 to 20 carbon atoms and aryl, such as phenyl, alkylphenyl and halophenyl and in Formula II R represents alkyl having 1 to 20 carbon atoms.

Compounds (I), (II) and (III) (wherein in compound (II), in addition to alkyl, R may represent aryl) are prepared by reacting an appropriate disubstituted monochloro phosphine with chloramine and ammonia or a compound, which, for the purposes of the present invention, is the equivalent of chloramine and ammonia, such as hydrazine, hydrazine monohydrochloride and hydrazine dihydrochloride. Typical reactions which occur are summarized in the following equations:

(1) Chloramine-ammonia $R_2PCl + 2NH_3 + NH_2Cl \rightarrow [R_2P(NH_2)_2]Cl + NH_4Cl$
$2R_2PCl + 4NH_3 + 2NH_2Cl \rightarrow [R_2P(NH_2)\!=\!$
                                 $N\!-\!P(NH_2)R_2]Cl + 3NH_4Cl$ (2) Hydrazine Cl    NH
                           $|$       $||$
$2R_2PCl + 2NH_2NH_2 \rightarrow R_2P\!=\!N\!-\!PR_2 + NH_4Cl + NH_3$ (3) Hydrazine monohydrochloride (hydrazinium chloride)

$2R_2PCl + 2[NH_2NH_2]Cl \rightarrow R_2P\!=\!N\!-\!PR_2 + 2NH_4Cl + HCl$
                                              $|$      $||$
                                              Cl    NH (4) Hydrazine dihydrochloride $$2R_2PCl + 2[NH_3NH_2]Cl_2 \rightarrow R_2P\underset{Cl}{(-)}=N-\underset{NH}{\overset{\|}{P}}R_2 + 2NH_4Cl + 3HCl$$

In the above reactions the chloramine and hydrazine reactants are shown as being non-substituted. It is contemplated, however, that in the case of hydrazinium chlorides, hydrazinium chlorides having one or more hydrogen atoms on one nitrogen substituted, particularly the alkyl substituted members having alkyl substitutents ranging from 1 to about 20 carbon atoms, may be used.

To obtain compounds (I) and (II) above, the disubstituted halophosphine is reacted with the chloramine-ammonia mixture (or equivalent thereto) preferably in the presence of an inert solvent. The ratio of the reactants is not particularly critical. However, to obtain optimum yields of the desired products, it is preferred that a stoichiometric excess of chloramine and ammonia (or equivalent) be used. When a chloramine-ammonia mixture is used as a preferred embodiment of the present invention, the chloramine-ammonia mixture may be conveniently produced in accordance with the teachings of U.S. Patent 2,837,409 to H. Sisler. This patent describes a method for preparing chloramine which comprises reacting anhydrous chlorine with an excess of anhydrous ammonia in the gaseous phase, and removing by filtration the ammonium chloride produced in the reaction. The molar ratio of ammonia to chlorine is maintained at greater than about 2 to 1 to prevent undesired side reactions from occurring.

In the present reactions mixtures of compounds (I), (II) and (III) are obtained as well as certain amounts of polymeric products. However, to favor the formation of a given intermediate certain generalizations may be made as to preferred reaction conditions.

In the event it is desired to obtain a predominance of compound (I) in the present reaction, lower temperatures ranging from about 0 to about 150° C. are used. At these temperatures, from about 0 to about 60 minutes are required to obtain substantial yields of product.

On the other hand, if it is desired to obtain a predominance of compound (II) or (III) reaction temperature ranges from about 150 to about 300° C. and substantially the same reaction times are used.

The present reaction is preferably conducted in the presence of inert organic solvents such as saturated and unsaturated hydrocarbons having from about 5 to 12 carbon atoms and a boiling point ranging anywhere from about 50 to 200° C. Halogenated hydrocarbons falling within this boiling range may also be advantageously used. Typical examples of inert solvents which may be used in the present reaction are tetrachloroethane, benzene, pentane, heptane, chlorobenzene and cyclohexane.

Subsequent to the reaction compounds (I), (II) and (III) are recovered from the reaction mixture by standard extraction and fractional crystallization techniques.

NOVEL LINEAR ALKYL SUBSTITUTED PHOSPHONITRILIC POLYMERS AND PREPARATION THEREOF

The linear phosphonitrilic polymers contemplated herein possess the general repeating structural unit:

(IV) $\quad (R_2P=N)_n$ wherein R is alkyl having 1 to 20 carbon atoms and $n$ has a value greater than 2 and preferably from about 10 to about 10,000. These polymers are prepared by heating intermediate compounds (I), (II) and (III) (wherein R is alkyl) to a temperature in excess of about 100° C. up to about 250° C.

The polymerization reaction which occurs using intermediate (I) is summarized by the following equation:

$$n[R_2P(NH_2)_2]Cl \rightarrow (R_2PN)_n + nNH_4Cl$$

Polymers (IV) above possess from about 10 to about 10,000 repeating units which results in molecular weights ranging from about 950 to about $6 \times 10^6$ depending on the molecular weight of R. These polymers have melting points which range from about 130 to about 250° C. The polymers are generally described as non-volatile, glassy linear products which are soluble in benzene, chloroform but insoluble in acetone and water.

These polymers possess valuable utility in high temperature applications in that they remain stable for extended periods of time at temperatures in excess of about 250° C.

The present polymers are prepared by heating intermediates (I), (II) and (III) at temperatures in excess of about 200° C. for times ranging from about 1 to about 48 hours. Preferably the heating is carried out under vacuum. The residue which remains subsequent to the heating under vacuum may be dissolved in benzene at temperatures ranging from 30–35° C. and subsequently be precipitated at lower temperatures on the order of 25° C. Infra-red analysis and quantitative elemental analysis sustains the structure (IV) indicated above.

In a preferred embodiment, the heating or compound (I) to produced linear polymer (IV) is conducted in the presence of up to about 30% by weight of ammonium chloride ($NH_4Cl$). The presence of the ammonium chloride enhances the formation of the desired polymer.

PREPARATION OF CYCLIC PHOSPHONITRILES

The present method for preparing cyclic phosphonitriles of the formula:

(V) $\quad (R_2P=N)_{3 \text{ and } 4}$ wherein R may represent phenyl and alkyl having 1 to 20 carbon atoms involves heating compound (I), wherein R represents alkyl and aryl and compounds (II) and (III), wherein R represents aryl and alkyl, to a temperature in excess of from about 25° C. for about 1 to 48 hours. Typical reactions which occur are as follows:

$$3[R_2P(NH_2)_2]Cl \rightarrow (R_2P=N)_3 + 3NH_4Cl$$
$$4[R_2P(NH_2)_2]Cl \rightarrow (R_2P=N)_4 + 4NH_4Cl$$
$$2[R_2P(NH_2)=N-P(NH_2)R_2]Cl \rightarrow (R_2P=N)_4 + 2NH_4Cl$$

$$2\, R_2P\underset{Cl}{(-)}=N-\underset{NH}{\overset{\|}{P}}R_2 \longrightarrow (R_2P=N)_4 + 2\,HCl$$

Furthermore, cyclic phosphonitrilics (V) may be prepared directly from the reaction mixture used to prepare intermediates (I), (II), and (III) without any intermediate separation of (I), (II) or (III). In such case the reaction mixture is merely held at a temperature in excess of 25° C. for this required time. Typical overall reactions which occur as follows:

$$3R_2PCl + 6NH_3 + 3NH_2Cl \rightarrow (R_2P=N)_3 + 6NH_4Cl$$
$$4R_2PCl + 8NH_3 + 4NH_2Cl \rightarrow (R_2P=N)_4 + 8NH_4Cl$$
$$3R_1PCl + 3[NH_3NH_2]Cl \rightarrow (R_2P=N)_3 + 3NH_4Cl + 3HCl$$
$$4R_2PCl + 4[NH_3NH_2]Cl \rightarrow (R_2P=N)_4 + 4NH_4Cl + 4HCl$$
$$3R_2PCl + 3NH_2NH_2 \rightarrow (R_2P=N)_3 + 3NH_4Cl$$
$$4R_2PCl + 4NH_2NH_2 \rightarrow (R_2P=N)_4 + 4NH_4Cl$$

In a preferred procedure for preparing cyclic polymers (V) the heating of (I), (II) and (III) is conducted in the absence of ammonium chloride. By conducting the reaction under vacuum ammonium chloride is sublimed from the reaction mixture and the desired condition is achieved. Vacuums on the order of 0.5 mm. of Hg produce a satisfactory result.

Having described the basic aspects of the present invention, the following examples are given to illustrate embodiments thereof.

Example I

Dimethyl chlorophosphine (0.0206 mole) was dissolved in 50 milliliters of dried benzene and exposed to the affluent gases of a chloramine generator which produced about 0.0018 mole of chloramine and 0.022 mole of ammonia per minute. An ice bath was used to cool the mixture at the beginning of the chloramine ammonia addition. A white precipitate formed immediately and the chloramination was continued for 15 minutes whereupon approximately 0.02 mole of chloramine had been added to the reaction mixture. Subsequently, the benzene was removed by filtration and the solid reaction products were extracted with several 50 milliliters portions of hot 50,50-ethanol-acetone mixture. The dimethyl diamino phosphonium chloride, which was produced during the reaction, was precipitated from the extracts as the micro crystalline powder by addition of petroleum ether. The melting point of the material was 195–200° C. The yield was 1.60 grams which represented a 60% yield based on dimethyl chlorophosphine used.

Elemental analysis determined the following values: C, 18.44; H, 7.84; P, 23.82; N, 22.00; Cl, 28.1. Calculated for [(CH$_3$)$_2$P(NH$_2$)$_2$]Cl: C, 18.69; H, 7.84; P, 24.10; N, 21.79; Cl, 27.58.

Example II

A 1.2 gram sample of dimethyl diaminophosphonium chloride prepared by the process similar to that set forth in Example I was placed in a vacuum sublimation apparatus mixed with 0.13 gram of NH$_4$Cl and heated under a vacuum of about 0.20 millimeter of mercury at temperature of 200–220° C. This temperature pressure was maintained for about 3 days. At the end of this period a white sublimate had formed on a coldfinger within the apparatus and a glassy residue remained in the pot. This residue was determined to be a linear phosphonitrilic polymer. The yield was 0.22 gram which represented a 32% yield based on dimethyl diamino phosphonium chloride used.

The crude phosphonitrilic polymer which comprised repeating monomeric units [(CH$_3$)$_2$PN]$_n$ as obtained from the pot had a dark glassy appearance. The polymer is soluble in benzene at a temperature of 30–35° C. and precipitates as a flocculent when the benzene solution is cooled to 25° C. The polymer was soluble in chloroform and insoluble in acetone and water. Evaporation of the benzene solution of the polymer yields a light brown powder which melts at 137–141° C. The average molecular weight was determined at 7640, as determined in a benzene solution with a Mecrolab vapor pressure asmometer.

The analyzed composition was: C, 31.81; H, 8.16; N, 18.79; P, 41.14. Calculated for CH$_3$PN: C, 32.01; H. 8.06; N, 18.66; P, 41.28. The infra-red spectrum of the polymer shows strong peaks at 690 cm.$^{-1}$, 725–763, 850–930, 950–970, 1100–1390, 1420–2000, 2950–3000.

Example III 11.9 grams of diphenyl chlorophosphine and 7.0 grams of triethyl hydrazinium chloride were heated together in absence of solvent at a temperature of 130–140° C. for 40 hours. Hydrogen chloride gas evolved during this period. The reaction mixture was digested in benzene, filtered and the filter was cooled. A white precipitate formed which was identified as [(C$_6$H$_5$)$_2$PN]$_3$ by melting point and infra-red spectrum. The material was obtained in a yield of 41% of theory based on the diphenyl chlorophosphine used. The benzene insoluble portion was identified as [(C$_2$H$_5$)$_3$NH]Cl.

Example IV 1.7 grams (0.008 mole) of diphenyl monochlorophosphine and 1.1 gram (0.01 mole) of hydrazine dihydrochloride having the formula (NH$_3$NH$_3$)Cl$_2$ was heated in an anhydrous system at atmospheric pressure for 48 hours at a temperature of 245 to 250° C. During the initial period of the reaction considerable hydrogen chloride was involved. At the end of the 48 hour period the pressure was reduced to 0.5 mm. Hg., for 4 hours to sublime ammonium chloride. The residue melted at 310–312° C. and weighted 0.6 gram which represented 40% yield based on the amount of diphenyl chlorophosphine used. This product was recrystallized from benzene and was subsequently found to posses a melting point of 318.5 to 319.5° C. When admixed with an authentic sample of phosphonitrile tetramer the substance melted at 318.5 to 319.5° C. Infra-red spectra of product and of the authentic tetramer sample were identical.

Example V

A mixture of 4.25 g. (0.02 mole) of diphenyl chlorophosphine was admixed with 2.7 g. (0.04 mole) of hydrazine monohydrochloride and heated at a temperature of 250° C. for about 48 hours. The reaction mixture was then subjected to a reduced pressure of 0.5 mm. Hg. for 3 hours to sublime ammonium chloride which formed during the reaction. The reaction product was subjected to multiple crystallizations from benzene. These crystallizations yielded 1.1 g. of diphenylphosphonitrile tetramer (28% yield) and 0.5 g. of diphenylphosphonitrile trimer (13% yield).

Example VI

A solution of 22.1 g. (0.1 mole) of diphenyl chlorophosphine in 50 ml. of sym. tetrachloroethane was added dropwise with stirring to a refluxing suspension of 7.0 g. (0.1 mole) of hydrazine monohydrochloride in 60 ml. of sym. tetrachloroethane. After stirring at reflux temperature (146° C.) for 4.5 hours the solids in the reaction mixture were filtered off and washed with benzene and ethyl ether. The solids were further extracted with boiling benzene which left a residue of ammonium chloride. White granular crystals (melting point 222–225° C.) weighing 3.2 g. separated from the combined solutions which held the products. Repeated crystallizations from benzene raised the melting point to 229–230° C. The infra-red spectrum and melting point of a mixture of the product with an authentic sample of diphenyl phosphonitrile trimer confirmed the fact that the product was diphenyl phosphonitrile trimer.

Evaporation of the filtrate obtained in the previous crystallizations yielded another 7.5 grams of trimer and 1.0 g. of a compound having the formula:

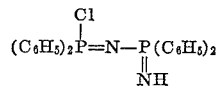

Pyrolysis of this compounded at near its melting point at 268° C. yielded 0.8 g. of diphenyl phosphonitrile trimer and tetramer in a ratio of about 5:1. Each of these products was identified by its infra-red spectrum, melting point, and mixed melting point with authentic sample of trimer and tetramer.

Example VII 5.74 grams of diphenylchlorophosphine (0.026 mole) was dissolved in 70 milliliters of tetrachloroethane (B.P. 144.6° C.). A mixture of ammonia and chloramine from from a chloramine generator was bubbled into the above solution for 20 minutes at room temperature. During the chloramine-ammonia addition, the temperature of the reaction mixture rose to the reflux temperature of the solvent. Subsequent to the chloramine-ammonia addition the precipitated reaction product was filtered and washed with tetrachloroethane. This crude product was found to weigh about 8 grams. This was dissolved in about 200 milliliters of benzene, boiled for a few minutes and filtered. From the filtrate about 1.08 grams of crystals which melted at 317 to 318° C. was isolated. This material was found to be essentially diphenylphosphonitrile tetramer and represented a 21% yield. From the same benzene solution, 0.30 gram of diphenylphosphonitrile trimer having a melting point of 231° C. separated. The yield of trimer was about 6.0%.

Example VIII

A mixture of ammonia and chloramine from a chloramine generator was bubbled for 40 minutes through a solution of 8 g. diphenyl chlorophosphine in 100 ml. of tetrachloroethane. The reaction vessel was heated externally by an infra-red lamp, which when combined with the best of reaction raised the temperature of the reaction mixture to reflux. After a few minutes the temperature was allowed to drop to the range of 80 to 90° C. At the end of the reaction the solid reaction products were filtered under an atmosphere of dry nitrogen and washed with 2–100 ml. portions of tetrachloroethane. The combined filtrate and washings were evaporated at reduced pressure yielding a light brown colored solid (4.1 gms.) (melting point 236 to 237° C.). Recrystallization from methanol raised the melting point to 240° C. and the product was identified as having formula $$[(C_6H_5)_2P(NH_2)=N-P(NH_2)(C_6H_5)_2]Cl$$

(referred to hereinafter as X) reaction was extracted with 2–100 ml. portions of benzene. Reduction of the volume of the benzene extract through evaporation yielded 1.6 gms. of a crystalline solid (melting point 114° C.). This solid was identified as a tetrachloroethane adduct of diphenylphosphinitrile trimer having the formula:

$$[(C_6H_5)_2PN]_3 \cdot 3C_2H_2Cl_4$$

On standing in the atmosphere or on being pumped in vacuum this adduct is converted quantitatively to diphenyl phosphinitrile trimer.

3.12 gms. of compound (X) was heated at 260 to 265° C. for a period of 3 hours and the resulting dark colored residue treated with 150 mls. of boiling benzene. Reduction of the volume of the resulting benzene solution lead to the formation of 1.52 gms. of a crystalline solid melting at 315 to 316° C. which was identified as diphenylphosphonitrile tetramer. This corresponds to a 55.4% yield. Further conversion of the mother liquor yielded a second crop of crystals (0.8 g.) which was also identified as diphenylphosphonitrile tetramer. Thus the pyrolysis of compound (X) at 260–265° C. for 3 hours produces the diphenylphosphonitrile trimer and tetramer in a gross yield of 85%.

Example IX

Repetition of the procedure set forth in Example VIII yielded the following results which are tabulated below:

| Run | Diphenyl-chlorophosphine | | Tetra-chloro-ethane | Yield of diphenyl phosphonitrile trimer tetra-chloroethane adduct | | Yield of compound (X) | |
|---|---|---|---|---|---|---|---|
| | G. | Moles | Ml. | G. | Percent | G. | Percent |
| 1 | 8.00 | 0.036 | 100 | 1.6 | 12.5 | 4.1 | 50 |
| 2 | 11.5 | 0.052 | 90 | 3.4 | 18 | 5.6 | 47.5 |
| 3 | 15.6 | 0.071 | 90 | 6.2 | 23 | | |

Example X

Diethylchlorophosphine (0.0154 mole) was dissolved in 50 ml. of benzene and exposed to the effluent gases of the chloramine generator for 12–15 minutes (0.016 mole of $NH_2Cl$ requires approximately 9.6 minutes. At the start of the chloramine-ammonia addition the solution grew warm and was cooled with an ice bath. A white precipitate formed immediately. At the completion of the reaction the benzene was removed by filtration and the solids were extracted with two 20 ml. portions of benzene. Upon evaporation of the benzene solution and washings, 2.41 g. of crude material melting at 45–50° C. was obtained. After purification by repeated recrystallizations from benzene the melting point was raised to 58–61° C.

*Analysis.*—Found: C, 37.29; H, 9.35; P, 23.68; Cl, 13.48. Calculated for $$[(C_2H_5)_2P(NH_2)-N-P(NH_2)(C_2H_5)_2]Cl:$$

C, 37.00; H, 9.31; P, 23.85; Cl, 13.65. Yield: 1.51 g. (75% of theory).

This material is water soluble and highly hygroscopic.

Example XI

The solids remaining in the reaction flask after the benzene extraction of Example X were extracted with two 25 ml. portions of absolute ethanol. The solution was concentrated to about half the original volume by evaporation, and ammonium chloride was precipitated by the addition of petroleum ether. The solution was filtered and further concentrated. When the formation of crystals was observed in the saturated solution, it was treated with acetone to quantitatively precipitate a white solid. Upon filtration and drying, the material melted at 100–103° C. Recrystallization from alcohol yield the pure product, M.P. 106–108.5° C.

*Analysis.*—Found: C, 30.33; H, 8.99; P, 19.51; N, 17.73; Cl, 22.86. Calculated for $[(C_2H_5)_2P(NH_2)_2]Cl$: C, 30.08; H, 9.01; P, 19.78; N, 17.89; Cl, 22.64. Yield: 0.46 g. (19% of theory).

This material is water soluble and highly hygroscopic.

Example XII

Di-n-butylchlorophosphine (0.0102 mole) was dissolved in 50 ml. of dry benzene and exposed to the effluent gases of the chloramine generator for 12–15 minutes. A white precipitate formed immediately. An ice bath was used to cool the mixture at the beginning of the chloramine-ammonia addition. At the completion of the reaction the benzene was removed by filtration and the solids were washed with two 20 ml. portions of dry benzene and filtered. The solids were then extracted with two 25 ml. portions of chloroform. The chloroform solution was removed from the insoluble ammonium chloride by filtration. Petroleum ether was added to the chloroform solution and a white, flocculent precipitate formed and was recovered by filtration. After purification by recrystallization from chloroform and drying in vacuum, the material melted at 113.5–115° C.

*Analysis.*—Found: C, 45.14; H, 10.45; P, 13.14. Calculated for $[(C_4H_9)_2P(NH_2)_2]Cl$: C, 45.17; H, 10.43; P, 14.56; N, 13.17. Yield: 0.53 g. (25% of theory).

The material is water soluble and highly hygroscopic.

Example XIII

Upon evaporation of the benzene solution obtained in Example XII an unidentified viscous oil was isolated. Most of the solvent was removed freezing the mixture in a Dry Ice-acetone bath and allowing it to thaw slowly under high vacuum. By repeating this procedure most of the solvent was removed and a wax-like product was recovered. The infrared spectrum of this wax is quite similar to that of $[(C_2H_5)_2P(NH_2)-N=P(NH_2(C_2H_5)_2]Cl$. The analytical data are compared in the table below with values calculated for the formulation $$[C_4H_9)_2P(NH_2)-N=P(NH_2)(C_4H_9)_2]Cl$$

0.89 gram of this wax was recovered.

| | Percent C | Percent H | Percent P | Percent N | Percent Cl |
|---|---|---|---|---|---|
| Found: | | | | | |
| Sample 1 | 53.11 | 11.48 | 16.44 | 8.82 | 7.53 |
| Sample 2 | 53.21 | 11.13 | 14.94 | 8.86 | 7.64 |
| Calculated for | | | | | |
| $C_{16}H_{40}P_2N_3Cl$ | 51.67 | 10.84 | 16.66 | 11.30 | 9.53 |

I claim:
1. A compound selected from the group consisting of

$$[R_2P(NH_2)_2]Cl$$

$$[R'_2P(NH_2)=N-P(NH_2)R'_2]Cl, \text{ and}$$

$$R_2P=N-\overset{NH}{\underset{Cl}{P}}R_2$$

wherein R and R' are alkyl groups having 1 to 4 carbon atoms.

2. The compound dimethyl diamino phosphonium chloride.

3. The compound diethyl diamino phosphonium chloride.

4. The compound dibutyl diamino phosphonium chloride.

5. A method for preparing a compound selected from the group consisting of $$[R_2P(NH_2)_2Cl,$$
$$[R_2P(NH_2)=N-P(NH_2)R_2]Cl$$

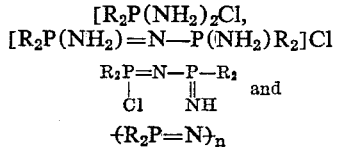 and $$\text{-}(R_2P=N)_n\text{-}$$

wherein R is selected from the group consisting of an alkyl group having 1 to 4 carbon atoms and $n$ has a value of 3 or 4 which comprises reacting in the presence of an inert solvent, under anhydrous conditions, a disubstituted monochlorophosphine having the formula $R_2PCl$, wherein R represents alkyl groups having 1 to 4 carbon atoms and phenyl groups, with a member selected from the group consisting of chloramine-ammonia mixture, hydrazine triethyl and unsubstituted hydrazinium chloride and hydrazine diyhydrochloride.

6. The method of claim 5 wherein the reaction is conducted at a temperature ranging from about 30 to 400° C.

7. The method of claim 5 wherein said heating is continued until ammonium chloride ceases to be produced in the reaction mixture.

8. A method for preparing linear polymer possessing the repeating structural unit $$\text{-}(R_2P=N)_n\text{-}$$

wherein R represents lower alkyl and $n$ has a value greater than 2, which comprises heating

wherein R represents alkyl groups having 1 to 4 carbon atoms to a temperature in excess of about 200° C. and recovering the polymer formed thereby.

9. The method of claim 8 conducted in the presence of up to 30% weight of ammonium chloride.

10. The method of claim 9 wherein said heating is conducted for a period of from about 1 to about 48 hours.

References Cited

UNITED STATES PATENTS

| 2,192,921 | 3/1940 | Lipkin | 260—2 |
| 3,169,933 | 2/1965 | Liu et al. | 260—2 |

OTHER REFERENCES

Benzman et al.: Chemistry and Industry, pp. 839–840 (June 25, 1960).

Sisler et al.: Inorganic Chemistry, vol. I, No. I, pp. 84–88 (February 1962).

HENRY R. JILES, *Primary Examiner.*

H. I. MOATZ, *Assistant Examiner.*

U.S. Cl. X.R.

260—2